United States Patent [19]

Sugibayashi

[11] Patent Number: 5,323,277
[45] Date of Patent: Jun. 21, 1994

[54] SOUND RECORDING APPARATUS

[75] Inventor: Hideaki Sugibayashi, Kyoto, Japan

[73] Assignee: Rohm Co., Ltd., Kyoto, Japan

[21] Appl. No.: 125,164

[22] Filed: Sep. 23, 1993

[30] Foreign Application Priority Data

Sep. 24, 1992 [JP] Japan .................................. 4-254608

[51] Int. Cl.⁵ ............................................. G11B 5/035
[52] U.S. Cl. ........................................ 360/65; 358/341;
381/98; 381/101; 333/28 R; 333/214; 360/68;
348/738
[58] Field of Search ....................... 358/341, 198, 184;
360/65, 66, 67, 68; 381/98, 101, 102, 103, 106;
333/28 R, 28 T, 214, 215

[56] References Cited

U.S. PATENT DOCUMENTS

| | | | |
|---|---|---|---|
| 4,046,960 | 9/1977 | Veale | 333/28 T |
| 4,500,932 | 2/1985 | Sato et al. | 360/65 |
| 4,521,750 | 6/1985 | Fukushima et al. | 333/28 R |
| 4,890,170 | 12/1989 | Inohana et al. | 360/65 |
| 5,223,990 | 6/1993 | Yoshida et al. | 360/65 |

FOREIGN PATENT DOCUMENTS 527579 2/1993 European Pat. Off. .

Primary Examiner—Tommy P. Chin
Assistant Examiner—Khoi Truong
Attorney, Agent, or Firm—Nikaido, Marmelstein, Murray & Oram

[57] ABSTRACT

A sound recording apparatus for use in video tape recorders, for equalizing a sound signal before the sound signal is recorded onto a recording medium includes an operational amplifier where the sound signal is inputted to its first input terminal, a feedback resistor connected to an output terminal and a second input terminal of the operational amplifier, and a simulated inductor circuit connected to the second input terminal of the operational amplifier. The simulated inductor circuit has a buffer where a predetermined bias is provided to its input. Between an output of the buffer and the second input terminal of the operational amplifier is connected an impedance network whose circuit constant is switched by a switch which operates according to a recording speed mode of the video tape recorder. This switching changes an equalizing characteristic of the amplifier.

11 Claims, 3 Drawing Sheets

SOUND RECORDING APPARATUS

BACKGROUND OF THE INVENTION

1. Field of the Invention

The present invention relates to a sound recording apparatus, and more particularly, to a standard (normal) sound signal recording apparatus for use in video tape recorders (VTRs).

2. Description of the Prior Art

In VTRs, a standard sound signal is equalized before being recorded onto a sound track of a magnetic tape. The equalization is performed in accordance with a recording speed mode such as an extended play (EP) mode or a standard play (SP) mode.

Referring to FIG. 1, there is shown a conventional circuit where the equalization is performed in accordance with the recording speed mode. Numeral 1 is an operational amplifier. To a non-inverting input terminal (+) thereof, a sound signal is supplied. To an inverting input terminal (−) thereof, a negative feedback is applied from an output terminal thereof via resistors R3 and R4. A first series circuit 2 consisting of an inductance coil L, a capacitor C1 and a resistor R1 which are discrete parts is connected to the inverting input terminal (−) of the operational amplifier 1 and to ground. A second series circuit 4 consisting of a capacitor C2, a resistor R2 and a switch 3 is connected to the inverting input terminal (−) via a node (a) between the inductance coil L and the capacitor C1, and to ground.

In the SP mode, the switch 3 is OFF, so that the capacitor C2 and the resistor R2 constituting the second series circuit 4 are disabled and only the first series circuit 2 is activated. Under this condition, the resonant frequency takes a relatively high value f1 in middle and high bands as shown in FIG. 2. The gain (voltage gain) of the operational amplifier 1 is boosted in such manner that the frequency f1 is the center frequency.

That is, the resonant frequency f1 is $$f1 = \frac{1}{2\pi\sqrt{LC1}} \ (Hz)$$

A gain Gv1 in the vicinity of the frequency f1 (i.e. in the boosted band) is $$Gv1 = 20\log\left(\frac{Z1 + R3}{Z1}\right) (dB)$$

where $$Z1 = R4 // \left(R1 + \omega L + \frac{1}{\omega C1}\right)$$

In the EP mode, the switch 3 is ON, so that the second series circuit 4 is activated as well as the first series circuit 2. Under this condition, the resonant frequency takes a relatively low value f2 in the middle and high bands. The gain of the operational amplifier 1 is boosted in such manner that the frequency f2 is the center frequency.

That is, the resonant frequency f2 is $$f2 = \frac{1}{2\pi\sqrt{L(C1 + C2)}} \ (Hz)$$

A gain Gv2 in the vicinity of the frequency f2 is $$Gv2 = 20\log\left(\frac{Z2 + R3}{Z2}\right) (dB)$$

where $$Z2 = R4 // \left[\omega L + \left(\left(\frac{1}{\omega C1} + R1\right) // \left(\frac{1}{\omega C2} + R2\right)\right)\right]$$

Thus, in each recording speed mode, the sound signal is equalized in such manner that the predetermined band is boosted. Then, the equalized sound signal is directed to a succeeding circuit (not shown), where it is recorded onto a sound track of a magnetic tape through a magnetic head.

In FIG. 2, the portion of the band which is still higher than the middle and high bands is not boosted. This is because no standard sound signals for VTRs are present in that portion.

In the conventional circuit where the discrete inductance coil L is used on the negative feedback side of the operational amplifier 1, it is highly probable that electromagnetic induction with an external environment (e.g. a television receiver) occurs through the inductance coil L. Further, the cost of the inductance coil L which is comparatively high compared to those of capacitors and resistors increases the cost of the entire apparatus. Moreover, an additional work is required to connect the coil L.

SUMMARY OF THE INVENTION

An object of the present invention is to provide a sound recording apparatus having an equalizing circuit which is of low cost and advantageous in manufacture and where there is no possibility of electromagnetic induction with external environments and the setting of its equalization characteristic is easy.

To achieve the above-mentioned object, a sound recording apparatus of the present invention for equalizing a sound signal before the sound signal is recorded onto a recording medium, is provided with an operational amplifier wherein the sound signal is inputted to a first input terminal thereof, feedback means connected to an output terminal of said operational amplifier and to a second input terminal of said operational amplifier, and a simulated inductor circuit connected to the second input terminal of said operational amplifier, said simulated inductor circuit including a buffer wherein a predetermined bias is provided to an input thereof, an impedance network connected between an output of said buffer and the second input terminal of the operational amplifier, and changeover means for changing a circuit constant of said impedance network in accordance with a recording speed mode of a video tape recorder to change an equalizing characteristic.

According to such a feature, since the simulated inductor circuit is used instead of a coil which is as used in the conventional circuit, electromagnetic induction hardly occurs even if an external environment has a coil generating a magnetic field. Since noise is hardly picked up from external sources, the recording of a high quality sound signal is realized.

Further, since in the simulated inductor circuit, its resonant frequency, gain and resonance quality factor thereof are changed by connecting and disconnecting the series circuit consisting of the capacitor and resistor to and from the impedance circuit, the setting of an optimum equalization characteristic is readily achieved.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
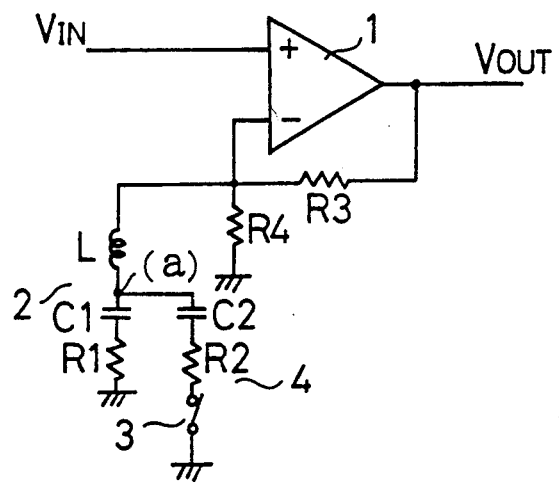
FIG. 1 is a circuit diagram of an equalizing circuit portion of a conventional sound recording apparatus.
Figure 2:
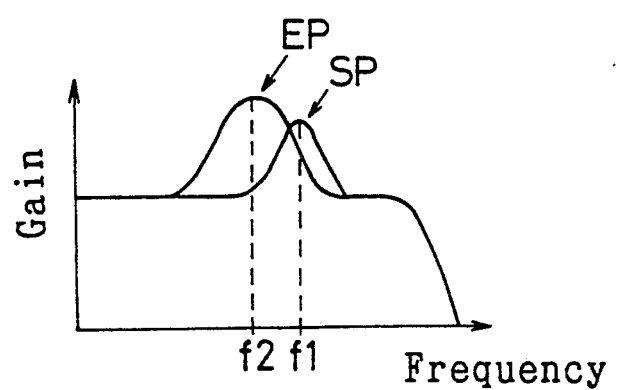
FIG. 2 graphically shows equalizing characteristics thereof.
Figure 3:
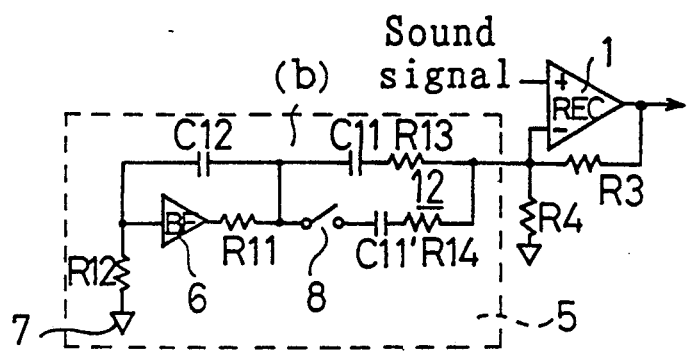
FIG. 3 is a circuit diagram of an equalizing circuit portion of a sound recording apparatus embodying the present invention.
Figure 4:
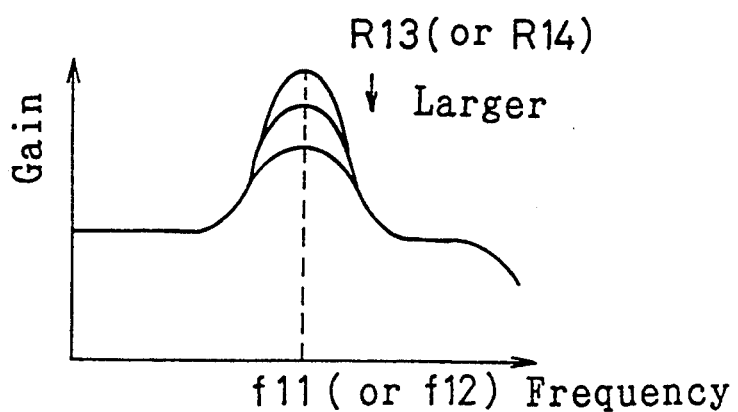
FIG. 4 graphically shows equalizing characteristics thereof.

Referring first to FIGS. 3 and 4, an equalizing circuit portion of a sound recording apparatus embodying the present invention will be described. In FIG. 3, the same elements as those of the above-described conventional circuit of FIG. 1 are indicated by the same reference designations, and a description thereof will be omitted.

In this embodiment, to perform the equalization in accordance with the recording mode such as the SP or EP mode, a simulated inductor circuit 5 as shown in FIG. 3 is connected to the inverting input terminal (−) of the operational amplifier 1 to which a negative feedback is applied from the output thereof via the resistors R3 and R4.

The simulated inductor circuit 5 includes a buffer 6, a resistor R12 coupling the input terminal of the buffer 6 to a bias point 7, a feedback capacitor C12 connected to the input of the buffer 6 and to a resistor R11 arranged on the output side which capacitor C12 constitutes a feedback path for the application of the negative feedback to the buffer 6, an impedance network 12 connected between a node (b) on the buffer output side of the capacitor C12 and the inverting input terminal (−) of the operational amplifier 1. The impedance network 12 includes a series circuit consisting of a capacitor C11 and a resistor R13, a switch 8 provided on the output side of the buffer 6 with the resistor R11 therebetween and being ON in the EP mode, and a series circuit consisting of a capacitor C11' and a resistor R14 connected in parallel with the series circuit consisting of the capacitor C11 and resistor R13 when the switch 8 is ON.

In the SP mode, the switch 8 is OFF, so that the series circuit consisting of the capacitor C11' and resistor R14 is disabled and the series circuit consisting of the capacitor C11 and resistor R13 is activated.

Under this condition, a resonant frequency f11 depends on the resistors R11 and R12 and the capacitors C11 and C12. The gain of the operational amplifier 1 is boosted in such manner that the frequency f11 is the center frequency.

That is, the resonant frequency f1 is $$f11 = \frac{1}{2\pi \sqrt{R11 R12 C11 C12}} \;(Hz)$$

A gain Gv11 in the vicinity of the frequency f11 is $$Gv11 = 20\log\left(\frac{Z11 + R3}{Z11}\right)(dB)$$

where $$Z11 = R4 // \left(\frac{1}{\omega C11} + R11 + \omega R11 R12 C12 + R13\right)$$

At this time, the resonant frequency f11 is changed by the capacitor C11 irrespective of the resistors R12 and R11 and the feedback capacitor C12. Moreover, the gain Gv11 and the resonance quality factor Q1 are changed by the resistor R13 without the frequency f11 being changed. That is, the gain Gv11 in the vicinity of the frequency f11 is decreased by increasing the resistor R13 (see FIG. 4), so that the resonance quality factor Q1 is decreased. As a result, an equalization characteristic optimum for the SP mode is obtained.

In the EP mode, the switch 8 is ON, so that the capacitor C11' and the resistor R14 are connected via the resistor R11 to the output of the buffer 6. Consequently, the series circuit consisting of the capacitor C11' and resistor R14 is activated in parallel with the series circuit consisting of the capacitor C11 and resistor R13.

Under this condition, a resonant frequency f12 depends on the capacitor C11'. The gain of the operational amplifier 1 is boosted in such manner that the frequency f12 is the center frequency.

That is, the resonant frequency f12 is $$f12 = \frac{1}{2\pi \sqrt{R11 R12 (C11 + C11') C12}} \;(Hz)$$

A gain Gv12 in the vicinity of the frequency f12 is $$Gv12 = 20\log\left(\frac{Z12 + R3}{Z12}\right)(dB)$$

where $$Z12 = R4 // \left[\left(\left(\frac{1}{\omega C11} + R13\right) // \left(\frac{1}{\omega C11'} + R14\right)\right) + R11 + \omega R11 R12 C12\right]$$

At this time, the gain Gv12 in the vicinity of the frequency f12 is decreased by increasing the resistor R14 (see FIG. 4), so that a resonance quality factor Q2 is decreased. Thereby, the gain Gv12 and the resonance quality factor Q2 are set without the resonance frequency f2 being changed. As a result, an equalization characteristic optimum for the EP mode is obtained. A gain Gv in a predetermined band other than the boosted band is $$Gv = 20\log\left(\frac{R3 + R4}{R4}\right) (dB)$$

Figure 5:
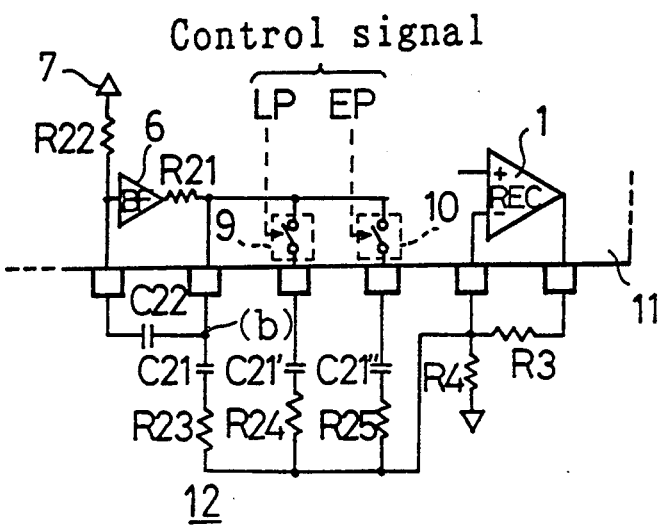
FIG. 5 is a circuit diagram of a specific embodiment of the present invention.

Referring now to FIG. 5, there is shown an embodiment where the buffer 6, resistors R22 and R21 arranged on the input and output sides of the buffer 6, respectively, and first and second switches 9 and 10 turned on and off according to the recording speed modes such as the EP and LP (long play) modes are formed, together with the operational amplifier 1, within a semiconductor integrated circuit (hereinafter referred to as IC) 11.

The first and second switches 9 and 10 are turned on by a control signal supplied in accordance with the recording speed mode. In practice, as the first and second switches 9 and 10, analog switches suitable for being formed in an IC, for example, complementary transistors whose bases receive control signals are used. This is because the switches 9 and 10 are arranged on the output side of the low-impedance buffer 6.

In this arrangement, in the SP mode, the first and second switches 9 and 10 are both turned off in the IC 11 by the control signal. As a result, an equalization characteristic suitable for the SP mode is set by a resonant frequency f21, a resonance quality factor Q21 and a gain Gv21 obtained at this time.

That is, the resonant frequency f21 is $$f21 = \frac{1}{2\pi\sqrt{R21R22C21C22}} (Hz)$$

The gain Gv21 in the vicinity of the frequency f21 is $$Gv21 = 20\log\left(\frac{Z21 + R3}{Z21}\right) (dB)$$

where $$Z21 = R4//\left(R23 + \frac{1}{\omega C21} + R21 + \omega R21R22C22\right)$$

At this time, the resonant frequency f21, the gain Gv21 and the resonance quality factor Q21 are changed by a capacitor C21 and a resistor R23 irrespective of the resistors R22 and R21 and the feedback capacitor C22.

In the LP mode, only the first switch 9 is turned on in the IC 11 by the control signal. As a result, an equalization characteristic suitable for the LP mode is set by a series circuit consisting of a capacitor C21' and a resistor R24 connected in parallel with the capacitor C21 and the resistor R23.

That is, the resonant frequency f22 is $$f22 = \frac{1}{2\pi\sqrt{R21R22(C21 + C21')C22}} (Hz)$$

The gain Gv22 in the vicinity of the frequency f22 is $$Gv22 = 20\log\left(\frac{Z22 + R3}{Z22}\right) (dB)$$

where $$Z22 = R4//\left[\left\{\left(R23 + \frac{1}{\omega C21}\right)//\left(R24 + \frac{1}{\omega C21'}\right)\right\} + R21 + \omega R21R22C22\right]$$

For this reason, the gain Gv22 is decreased by setting the resonant frequency f22 only by the capacitor C21' and by setting the gain Gv 22 and the resonance quality factor Q22 by the resistor R24 without changing the frequency f22, that is, by increasing the resistor R24, so that the resonance quality factor Q22 is decreased.

Likewise, in the EP mode, the first and second switches 9 and 10 are both turned on in the IC 11 by the control signal, so that an equalization characteristic suitable for the EP mode is set by a series circuit, further connected in parallel, consisting of a capacitor C21" and a resistor R25.

That is, a resonant frequency f23 is $$f23 = \frac{1}{2\pi\sqrt{R21R22(C21 + C21' + C21'')C22}} (Hz)$$

A gain Gv23 in the vicinity of the frequency f23 is $$Gv23 = 20\log\left(\frac{Z23 + R3}{Z23}\right) (dB)$$

where $$Z23 = R4//\left[\left\{\left(R23 + \frac{1}{\omega C21}\right)//\left(R24 + \frac{1}{\omega C21'}\right)//\left(R25 + \frac{1}{\omega C21''}\right)\right\} + R21 + \omega R21R22C22\right]$$

For this reason, the gain Gv23 is decreased by setting the resonant frequency f23 only by the capacitor C21" and by setting the gain Gv23 and the resonance quality factor Q23 by the resistor R25 without changing the frequency f23, that is, by increasing the resistor R25, so that the resonance quality factor Q23 is decreased.

Figure 6:
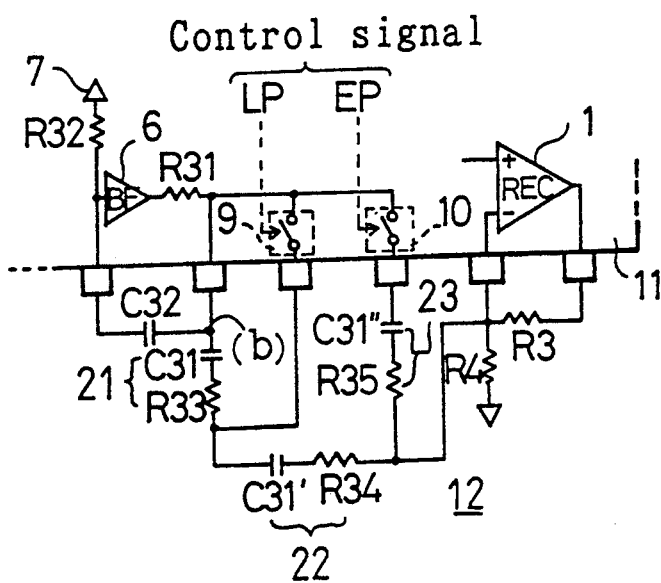
FIG. 6 is a circuit diagram of another embodiment of the present invention.

While in the embodiment of FIG. 5, an equalization characteristic in accordance with each recording mode is obtained by changing a circuit constant by successively activating the second and third series circuits consisting respectively of the capacitor C21' and resistor R24 and of the capacitor C21" and resistor R25 in parallel with the first series circuit consisting of the capacitor C21 and resistor R23, the circuit constant may be changed as shown in FIG. 6 by activating and disabling series circuits each consisting of a capacitor and a resistor which circuits constitute a part of the impedance network.

Specifically, in the embodiment of FIG. 6, the first, second and third series circuits 21, 22 and 23 each consisting of a resistor and a capacitor are provided in an impedance network 12. The first series circuit 21 is connected at its one end to the output of the buffer 6.

The other end of the first series circuit 21 and one end of the second series circuit 22 are connected via the first switch 9 to the output of the buffer 6. The other end of the second series circuit 22 and one end of the third series circuit 23 are connected to a second input terminal (−) of the operational amplifier 1. The other end of the third series circuit 23 is connected via the second switch 10 to the output of the buffer 6.

In the SP mode, the first and second switches 9 and 10 are both turned off in the IC by the control signal, so that the first series circuit 21 consisting of a capacitor C31 and a resistor R33 and the second series circuit 22 consisting of a capacitor C31' and a resistor R34 arranged between the node (b) and the operational amplifier 1 are activated. As a result, an equalization characteristic suitable for the SP mode is set by a resonant frequency f31, a resonance quality factor Q31 and a gain Gv31 obtained at that time.

That is, the resonant frequency f31 is $$f31 = \frac{1}{2\pi \sqrt{R31R32\left(\frac{C31C31'}{C31 + C31'}\right)C32}} (Hz)$$

The gain Gv31 in the vicinity of the frequency f31 is $$Gv31 = 20\log\left(\frac{Z31 + R3}{Z31}\right)(dB)$$

where $$Z31 = R4 // \left( R33 + R34 + \frac{C31 + C31'}{\omega C31 C31'} + R31 + \omega R31R32C32 \right)$$

At this time, the resonant frequency f31, the gain Gv31 and the resonance quality factor Q31 are changed by the capacitor C31 and the resistor R33 irrespective of the resistors R32 and R31 and the feedback capacitor C32.

In the LP mode, only the first switch 9 is turned on in the IC 11 by the control signal, so that the first series circuit 21 consisting of the capacitor C31 and resistor R33 is disabled. As a result, an equalization characteristic suitable for the LP mode is set by the second series circuit consisting of the capacitor C31' and resistor R34.

That is, a resonant frequency f32 is $$f32 = \frac{1}{2\pi \sqrt{R31R32C31'C32}} (Hz)$$

A gain Gv32 in the vicinity of the frequency f32 is $$Gv32 = 20\log\left(\frac{Z32 + R3}{Z32}\right)(dB)$$

where $$Z32 = R4 // \left( R34 + \frac{1}{\omega C31'} + R31 + \omega R31R32C32 \right)$$

For this reason, the gain Gv 32 is decreased by setting the resonant frequency f32 only by the capacitor C31' and by setting the gain Gv 32 and the resonance quality factor Q32 by the resistor R34 without changing the frequency f32, that is, by increasing the resistor R34, so that the resonance quality factor Q32 is decreased.

Likewise, in the EP mode, the first and second switches 9 and 10 are both turned on in the IC 11 by the control signal, so that an equalization characteristic suitable for the EP mode is set by the third series circuit 23, connected in parallel, consisting of a capacitor C31" and a resistor R35.

That is, a resonant frequency f33 is $$f33 = \frac{1}{2\pi \sqrt{R31R32(C31' + C31'')C32}} (Hz)$$

A gain Gv33 in the vicinity of the frequency f33 is $$Gv33 = 20\log\left(\frac{Z33 + R3}{Z33}\right)(dB)$$

where $$Z33 = R4 // \left[ \left\{ \left( R34 + \frac{1}{\omega C31'} \right) // \left( R35 + \frac{1}{\omega C31''} \right) \right\} + R31 + \omega R31R32C32 \right]$$

For this reason, the gain Gv 32 is decreased by setting the resonant frequency f33 only by the capacitor C31" and by setting the gain Gv 33 and the resonance quality factor Q33 by the resistor R34 without changing the frequency f33, that is, by increasing the resistor R35, so that the resonance quality factor Q33 is decreased.

In the above-described embodiments, activating/disabling the series circuits is equivalent to changing a circuit constant of the impedance network.

According to the present invention, as described above, since the simulated inductor circuit is used instead of a coil, electromagnetic induction hardly occurs even if an external environment has a coil generating a magnetic field. Since noise is hardly picked up from external sources during the equalization, the recording of a high quality sound signal is realized. Moreover, the setting of its equalization characteristic is easy. Moreover, the cost is low compared to the prior art circuit where a discrete coil is used. Further, the circuit of the present invention is advantageous in manufacture since it may be realized in the form of an integrated circuit.

Obviously, many modifications and variations of the present invention are possible in light of the above teachings. It is therefore to be understood that within the scope of the appended claims, the invention may be practiced other than as specifically described.

What is claimed is:

1. A sound recording apparatus for equalizing a sound signal before the sound signal is recorded onto a recording medium, said sound recording apparatus comprising:
   an operational amplifier wherein the sound signal is inputted to a first input terminal thereof; and
   a simulated inductor circuit connected to a second input terminal of said operational amplifier, said simulated inductor circuit including:
   a buffer wherein a predetermined bias is provided to an input thereof;

an impedance network connected between said operational amplifier and a node, said node being located between an output of said buffer and feedback means for applying a feedback to said buffer; and changeover means for changing a circuit constant of said impedance network to change an equalization characteristic.

2. A sound recording apparatus according to claim 1, wherein said impedance network comprises a plurality of series circuits each including a resistor and a capacitor and wherein said changeover means includes switch means for selectively activating said series circuits in accordance with a recording speed mode of the sound signal.

3. A sound recording apparatus according to claim 2, wherein said buffer, said switch means and said operational amplifier are provided within a semiconductor integrated apparatus and said series circuit is externally connected to said semiconductor integrated apparatus.

4. A sound recording apparatus according to claim 2, wherein a plurality of said series circuits switched by said switch means are provided in parallel with each other.

5. A sound recording apparatus for use in a video tape recorder, for equalizing a sound signal before the sound signal is recorded onto a recording medium, said sound recording apparatus comprising:

an operational amplifier wherein the sound signal is inputted to a first input terminal thereof;

feedback means connected to an output terminal of said operational amplifier and to a second input terminal of said operational amplifier; and a simulated inductor circuit connected to the second input terminal of said operational amplifier, said simulated inductor circuit including:

a buffer wherein a predetermined bias is provided to an input thereof;

an impedance network connected between an output of said buffer and the second input terminal of the operational amplifier; and changeover means for changing a circuit constant of said impedance network in accordance with a recording speed mode of a video tape recorder to change an equalizing characteristic.

6. A sound recording apparatus according to claim 5, wherein said impedance network comprises a plurality of series circuits each including a resistor and a capacitor and wherein said changeover means includes switch means for selectively activating said series circuits in accordance with a recording speed mode of the sound signal.

7. A sound recording apparatus according to claim 6, wherein said buffer, said switch means and said operational amplifier are provided within a semiconductor integrated apparatus and said series circuit is externally connected to said semiconductor integrated apparatus.

8. A sound recording apparatus according to claim 6, wherein a plurality of said series circuits switched by said switch means are provided in parallel with each other.

9. A sound recording apparatus according to claim 5, wherein a first, a second and a third series circuits each consisting of a resistor and a capacitor are provided in said impedance network, wherein said first series circuit is connected at a first end thereof to the output of the buffer, wherein a second end of said first series circuit and a first end of said second series circuit are connected via first switch means to the output of the buffer, wherein a second end of said second series circuit and a first end of said third series circuit are connected to the second input terminal of the operational amplifier, and wherein a second end of said third series circuit is connected via a second switch means to the output terminal of the buffer.

10. A sound recording apparatus according to claim 9, wherein a combination of ON and OFF of the first and second switch means is determined according to the recording speed mode.

11. A sound recording apparatus according to claim 10, wherein said buffer, said first and second switch means and said operational amplifier are provided within a semiconductor integrated apparatus and said first, second and third series circuits are externally connected to the semiconductor integrated apparatus.

* * * * *